United States Patent [19]
Tobias et al.

[11] Patent Number: 5,286,288
[45] Date of Patent: Feb. 15, 1994

[54] HOT MELT INKS FOR CONTINUOUS JET PRINTING

[75] Inventors: Russell H. Tobias, Cary; Mairi C. MacLean, Mount Prospect; Nicholas A. Davies, Elgin, all of Ill.

[73] Assignee: Videojet Systems International, Inc., Wood Dale, Ill.

[21] Appl. No.: 29,892

[22] Filed: Mar. 11, 1993

[51] Int. Cl.$^5$ ............................................. C09D 11/02
[52] U.S. Cl. ................... 106/20 B; 106/20 D; 106/22 A; 106/22 H; 106/23 A; 106/23 H
[58] Field of Search ............... 106/20 B, 20 D, 22 A, 106/22 H, 23 A, 23 H

[56] References Cited

U.S. PATENT DOCUMENTS

| | | | |
|---|---|---|---|
| 3,994,736 | 11/1976 | Hertz et al. | 106/22 A |
| 5,017,223 | 5/1991 | Kobayashi et al. | 106/23 B |

*Primary Examiner*—Helene Klemanski
*Attorney, Agent, or Firm*—Leydig, Voit & Mayer, Ltd.

[57] ABSTRACT

A hot melt ink composition for use in continuous ink jet printing comprising an electrolyte, an electrolyte-solvating and dissociating compound and an image-forming agent, said ink being solid at about 25° C., said ink liquefying at a temperature between 75° C. and 175° C., and said ink in the liquid stage having a conductivity of greater than about 100 microsiemens/cm.

23 Claims, No Drawings

HOT MELT INKS FOR CONTINUOUS JET PRINTING

FIELD OF THE INVENTION

This invention relates to the field of continuous ink-jet printing, particularly to hot melt inks, and more particularly, to a new and improved conductive hot melt ink.

BACKGROUND OF THE INVENTION

In continuous ink-jet printing, ink is emitted in a continuous stream under pressure through at least one nozzle. The stream is perturbed, causing it to break up into droplets at a fixed distance from the nozzle. At the break-up point, the droplets are charged in accordance with digital data signals and passed through an electrostatic field which adjusts the trajectory of each droplet in order to direct it to a gutter for recirculation or a specific location on a recording medium. Therefore, for an ink to be useful in continuous ink-jet printing, it must be able to sustain an electric charge, and must have a viscosity sufficiently low to allow ink flow through the nozzle.

Typically, the inks used for continuous ink-jet printing are liquid at room temperature. Liquid inks present various difficulties: for example, they respond differently depending upon the type of printing media used. The use of liquid ink on office papers will produce a feathered appearance because the ink penetrates and spreads into the paper following fiber lines. Liquid inks that are designed for minimum feathering still require time to set, which may limit the rate that printed pages are stacked.

The print quality usually depends on the type of paper used, which also has an effect on the drying time and on waterfastness. Although water-borne inks have been widely used, they exhibit poor waterfastness. Also, in order to prevent the ink from drying in the jet, high concentrations of humectant such as diethylene glycol have been used. This also leads to a long drying (set) time for the print on the medium and poor print quality.

Liquid inks without curable additives typically are not useful on nonporous surfaces, such and metal, glass, or plastic, because they are too prone to smearing. Further, liquid inks are very sensitive to temperature changes which influence the ink viscosity and interfacial tension, which, in turn, influence the ink interaction with the medium.

It is clear from the foregoing that major problems with liquid ink-jet inks are (1) media dependent quality, (2) poor reliability, (3) poor waterfastness, and (4) a long drying (set) time for the printed ink.

One method of solving several of the abovementioned problems is to use what is termed a hot melt ink. This ink is normally solid at room temperature. When the ink is heated, it melts to form a low viscosity fluid which can be ejected as droplets.

Hot melt ink was originally used by Berry et al. (U.S. Pat. No. 3,653,932) in electrostatically controlled continuous ink-jet printing. The ink was comprised of a waxy component which is solid at room temperature. The term "hot melt ink" defines an ink that is in a solid phase at room temperature and in a fluid phase at the operating temperature.

Hot melt inks normally comprise vehicles, such as natural waxes, resins and/or long chain fatty acids, esters, or alcohols which melt when the ink is heated to jetting temperatures. Upon jetting, heated droplets impact the print medium and immediately freeze on the medium surface. This phenomenon is advantageous in several respects in that dark, sharply defined print may be produced. This print may be slightly raised, suggesting that the print is engraved. Since the ink is solid at room temperature, during storage and shipment the colorant systems have less tendency to separate out of the ink. This has facilitated the use of various colorant systems, such as certain pigment-based systems, which would not have normally been used in liquid inks.

Despite the aforementioned advantages of hot melt inks, they have been used only sparingly to date in continuous ink-jet printing. The low molecular weight waxes and polymers typically present in hot melt inks have low polarity and show very poor solvating ability towards ionic polar material used as electrolytes in continuous ink-jet printing. To sustain the electric charge required for continuous ink-jet printing, the electrolyte ions must dissociate in the ink composition, thereby allowing ionic separation upon application of an external electric field.

U.S. Pat. No. 4,684,956 relates to the use of hot melt inks for use in drop-on-demand printing operations, although the patent contains a statement that the inks can also be used in continuous ink-jet printing. However, the ink compositions disclosed therein do not have sufficient conductivity to be usable in continuous ink-jet printing.

U.S. Pat. No. 3,653,932, which was mentioned above, discloses a hot melt ink composition comprising one or two di-esters of sebacic acid which have been esterified with alcohols of paraffins having 12 or less carbon atoms in their chains. However the resistivity of these compositions is too high for electrical charging in continuous ink jet printing.

Japanese Patent Sho 55(1980)-54368 discloses the use of resistivity control agents, such as inorganic salts, water-soluble amines, metal soaps, and metal thiocyanates. However, these ink compositions have unacceptably high volatilities at printing temperatures.

Inks containing aromatic sulfonamides have also been suggested in the art. See, e.g., U.S. Pat. No. 4,878,946. These inks also have unacceptably high volatilities at printing temperatures. Moreover, the acidic nature of aromatic sulfonamides accelerates corrosion of printhead components.

Therefore, to date there has been no hot melt ink for continuous ink-jet printing which has good conductivity, low volatility, low resistance, and acceptable viscosity.

SUMMARY OF THE INVENTION

The present invention overcomes the problems associated with prior art hot melt ink compositions for continuous ink-jet printing, and achieves distinct advantages thereover. In accordance with one aspect of the present invention, a hot melt ink composition is provided that comprises an electrolyte, and an electrolyte-solvating and dissociating compound selected from the group consisting of alkanolamides and polyethylene glycol. It is now possible to formulate hot melt inks for continuous ink-jet printing that have good adherence to a variety of substrates, and yield printed images with improved smear resistance when applied to a substrate. These inks may be applied at acceptable temperatures, such as from about 75° C. to about 175° C., preferably from about 90° C. to about 140° C., and most preferably at about 115° C.

The hot melt inks of the present invention may also comprise, and preferably do comprise, in addition to the two components mentioned above, a viscosity reducing agent, and a hardening agent. A flexibilizing agent may also be used to reduce ink brittleness. These ink compositions melt in the ranges discussed above, and have a viscosity in the molten stage of from about 1 centipoise(cp) to about 50 centipoises at a temperature from about 75° C. to about 175° C., preferably from about 2 centipoises to about 20 centipoises, and most preferably from about 5 centipoises to about 15 centipoises. Said ink compositions also have a conductivity from about 100 microsiemens/cm to about 5000 microsiemens/cm, preferably from about 500 microsiemens/cm to about 2000 microsiemens/cm, and most preferably from about 500 microsiemens/cm to about 1500 microsiemens/cm at a temperature from about 75° C. to about 175° C.

DETAILED DESCRIPTION OF PREFERRED EMBODIMENTS

Electrolyte

The electrolyte used in the present invention is an inorganic salt. Preferably, potassium thiocyanate should be used, but the lithium salt of trifluoromethanesulphonic acid, as well as cesium acetate and cesium iodide are also suitable. For the ink composition to have suitable conductivity, the electrolyte should be readily soluble and dissociate well in the specific electrolyte solvating and dissociating compound chosen. The electrolyte should also be thermally stable between 75°–175° C. and be non-toxic.

The electrolyte can be present in the ink composition in an amount from about 0.1% to about 5% by weight of the composition. Preferably, the ink composition should contain from about 0.5% to about 3% of electrolyte by weight of the composition.

Electrolyte-Solvating and Dissociating Compound

The electrolyte solvating and dissociating compound can be chosen from the group consisting of alkanolamides and polyethylene glycol. Preferably, an alkanolamide having the formula $C_nH_{2n+1}CONHR$, where n is an integer from 10–17, R is $CH_2CH_2OH$ or $(CH_2CH_2O)_xCH_2CH_2OH$, and x is an integer from 1 to 9 should be used, with lauryl monoethanolamide (n=11, R=$CH_2CH_2OH$) being most preferred. Lauryl monoethanolamide can be obtained from the McIntyre Group under the tradename Mackamide LMM. The alkanolamide to be used in the ink compositions of the present invention should be chosen on the basis of the conductivity, viscosity, volatility and melting point desired. It also must readily dissolve and dissociate the specific electrolyte chosen for use in the ink composition. Generally, for the preferred alkanolamides, as the value of n increases, the solubility of the electrolyte, the conductivity and volatility decrease, while viscosity and melting point increase. For a given value of n, where R is $(CH_2CH_2O)_xCH_2CH_2OH$, as the value of x increases, the solubility of the electrolyte, the conductivity, and viscosity increase, while melting point and volatility decrease. Further, the alkanolamides of the present invention where R=$(CH_2CH_2O)_xCH_2CH_2OH$ generally have higher conductivities than those where R=$CH_2CH_2OH$.

Alkanolamides useful in the present invention can also be obtained from Witco Company under the trademark Witcamide.

In addition to the above discussed compounds, bis-monoethanolamides and bis-diethanolamides of dibasic fatty acids may also be utilized in the present invention. One such useful compound has the chemical formula $(HOCH_2CH_2)_2NCOC_4H_8CON(CH_2CH_2OH)_2$ and is available from Rohm & Haas under the trademark Primid XL552.

Polyethylene glycol can also be used as the electrolyte-solvating and dissociating compound of the present invention. Polyethylene glycol having a molecular weight in the range of 1,000 to about 10,000 can be used, although as molecular weight increases, viscosity increases while conductivity decreases. Low molecular weight polyethylene glycol (below 1,000 MW) tends to smear excessively as it hardens, while high molecular weight polyethylene (above 10,000 MW) glycol becomes brittle. Therefore the use of polyethylene glycol having a molecular weight in the range of about 1000–2000 is preferred, because it results in an ink having good adhesion and minimal smearing.

Viscosity Reducing Agent

Viscosity reducing agents may also be employed in the ink compositions of the present invention. Use of a viscosity reducing agent allows the viscosity of the ink composition to be adjusted to a desired value. Suitable viscosity reducing agents for use in ink compositions of the present invention include stearamide, stearyl monoethanolamide stearate, and ethylene glycol distearate (EGDS). The viscosity reducing agent should be present in an amount of from about 0 to about 50 % by weight of the ink composition. Again, the specific amount of viscosity reducing agent used in a given ink composition depends on the viscosity desired by the user, and the specific electrolyte-solvating and dissociating compound employed.

Hardening Agent

A hardening agent may also be used in the ink compositions of the present invention to obtain ink having a desired hardness at room temperature. Useful hardening agents include ricinoleamides, hydroxystearamides, hydrogenated castor oil, EGDS, esters of methylene glycol, esters of propylene glycol, esters of ethylene glycol, esters of glycerol, stearyl esters of 12-hydroxystearic acid, and hydroxy acids, such as 12-hydroxydodecanoic acid and derivatives thereof.

Ricinoleamides and hydroxystearamides are preferably employed as the hardening agent, with N(2-hydroxyethyl)-12-hydroxystearamide (trademark Paricin 220 from CasChem, Inc.) being most preferred. Other suitable hydroxystearamides include Paricin 210, and Paricin 285, available from CasChem, Inc. These compounds substantially harden the ink composition at room temperature, yet maintain the conductivity of the ink composition in the liquid stage.

Although neither a viscosity reducing agent nor a hardening agent need be employed in the ink composition of the present invention, one or both are preferably employed. Most preferably, both a viscosity reducing agent and a hardening agent should be used. In such an ink composition, the electrolyte should be present in an amount from about 0.5 to 3.0 % by weight of the ink composition, and the electrolyte-solvating and dissociating compound, viscosity reducing agent, and hardening agent should be present in amounts of from about 30 to about 99%, from about 0 to about 50 %, and from about 0 to about 50%, respectively. Again, the specific amount of each component should be chosen based on the desired conductivity, viscosity, and hardness of the ink composition.

Flexibilizing Agent

A flexibilizing agent may also be used in the ink compositions of the present invention to reduce ink brittleness. Useful flexibilizing agents include ethylene vinyl acetate copolymers, polyamides, amide waxes, and ionomers. Useful ionomers may be prepared by copolymerization of a functionalized monomer with an olefinically unsaturated monomer or direct funotionalization of a preformed polymer.

Carboxyl-containing ionomers can be obtained by direct copolymerization of acrylic or methacrylic acid with ethylene, styrene, and similar comonomers by free-radical copolymerization. The resulting copolymer is generally available as the free acid, which can be neutralized to the degree desired with metal hydroxides, acetates, and similar salts. Typically, ionomers contain a certain number of inorganic salt groups attached to a polymer chain, such as from about 1 up to 15 mol % ionic groups pendants to a base polymer, such as hydrocarbon, oxygen or nitrogen-containing hydrocarbon or perfluorinated polymer chain. Preferably they contain from about 2 up to about 10 mol % ionic groups. An ionomer can be defined as a polymer composed of a covalently-bonded backbone containing a small amount (usually less than 15 mole percent) of pendant carboxylic acid, sulfonate or phosphate groups, or pendant or main-chain quaternary ammonium groups, which are neutralized, partially or completely, to form an ionomer. Ionic hydrocarbon polymers for elastomers or plastics are disclosed in U.S. Pat. No. 3,264,272.

The flexibilizing agent should be present in an amount of from about 0.1% to 25% by weight of the ink composition, and preferably is present in an amount from about 0.5% to 10% by weight.

Image Forming Components

The ink compositions of the present invention also comprise one or more image forming components, which are preferably oil miscible or soluble. The image forming material can be one which forms a visual image on the substrate, such as a colorant; or one which is detected by other means, such as a magnetic material to be scanned by a suitable reader, or a fluorescent material.

The amount of image forming agent is not critical. Typically the amount of image forming agent will be from about 0.1 to about 10 percent, based upon the weight of the jet ink composition, preferably from about 0.5 to about 5 percent, and most preferably from about 1 to about 2 percent.

The colorant may be either a dye or a pigment. Exemplary dyes include the following list: solvent yellow 162, 79, 81, solvent orange 56, solvent brown 58, solvent red 122, 119, 100, solvent blue 70, solvent red 35, solvent black 27, 45, 47, solvent red 49, basic red 51, solvent violet 8, solvent blue 4, disperse yellow 64, solvent red 135, solvent red 195, disperse violet 26, solvent yellow 16, 56, 6, 7, 14, solvent red , 23, 24, 27, 49, solvent blue 35, solvent black 3, disperse orange 201, solvent yellow 93, disperse yellow 54, disperse red 60, disperse blue 14, solvent red 52, disperse violet 31, and the like.

Suitable dyes for use in the inks of the present invention also include Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc., and the like. Particularly preferred are solvent dyes, and within the class of solvent dyes, spirit soluble dyes are preferred because of their high compatibility with binder materials. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Zapon Fast Blue 806 (BASF) and the like.

Amongst pigments that may be successfully used are the following: pigment yellows 1, 3, 12, 13, 14, 16, 17, 73, 74, 81, 83, 97, 98, 106, 113, and 114; pigment reds 2, 3, 4, 5, 6, 7, 8, 9, 12, 14, 37, 38, 48:1, 48;2, 48:3, 48:4, 57:1, 57:2, 57:3, 88, 122, 146, and 147; pigment blues 15:1, 15:2, 15:3, 15:4, 56, 61, 61:1; and pigment blacks 1, 20, carbon black, acetylene black, bone black, lamp black, graphite, and the like.

Examples of other suitable pigments include Violet Toner VT-8015 (Paul Uhlich), Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 I (Paul Uhlich), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 387 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (red orange) (Matheson, Coleman, Bell), Sudan II (orange) (Matheson, Coleman, Bell), Sudan IV (orange) (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Gelb L1250 (BASF), Suco-Yellow D1355 (BASF), Sico Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as Regal 330 Registered TM (Cabot), Carbon Black 5250 and Carbon Black 5750 (Columbian Chemicals Company).

Other Components

The ink composition of the present invention may contain a corrosion inhibitor in sufficient quantity to inhibit corrosion of metal placed in contact with the ink, without adversely affecting the printing characteristics of the ink.

Suitable corrosion inhibitors include from 0.5% to 5% of an essentially basic, heat-stable, metallo-organic sulphonate compound. The sulphonate compound may be selected from the group consisting of ammonium dinonyl naphthalene sulphonate, basic barium dinonyl naphthalene sulphonate, neutral barium dinonyl naphthalene sulphonate, ethylene diamine dinonyl naphthalene sulphonate, basic barium sulphonate naphthalene sulphonate, overbased sulphurized calcium alkyl phenate, basic calcium sulphonate, overbased calcium sulphonate and highly overbased calcium sulphonate.

The present invention may also comprise other additives, which may be any substance that can enhance the ink with regard to (i) improved solubility of other components, (ii) improved print quality, (iii) improved adhesion of the ink to the media, and/or (iv) control of wetting characteristics, which may be related to such properties as surface tension and viscosity, among other properties.

For example, the ink may contain a biocide. Suitable biocides include sorbic acid, 1-(3-chloroallyl)-3,5,7-triaza-1-azoniaadamantane chloride, commercially available as Dowicil 200 (Dow Chemical Company, Midland, Mich.), vinylenebisthiocyanate, commercially available as Cytox 3711 (American Cyanamid Company, Wayne, N.J.), disodiumethylenebis-dithiocarbamate, commercially available as Dithone D14 (Rohm & Haas Company, Philadelphia, Pa.), bis(trichloromethyl) sulfone, commercially available as Biocide N-1386 (Stauffer Chemical Company, Westport, Conn.), zinc pyridinethione, commercially available as zinc omadine (Olin Corporation Stamford, Conn.), 2-bromo-t-nitropropane-1,3-diol, commercially available as onyxide 500 (Onyx Chemical Company, Jersey City, N.J.), Bosquat MB50 (Louza, Inc., Fairtown, N.J.), and the like.

In addition, other optional additives such as dispersing agents or surfactants may be present. If present, they may be present in the ink in amounts of from about 0.01 to about 20 percent by weight. Further, plasticizers such as pentaerythritol tetrabenzoate, commercially available as Benzoflex S552 (Velsicol Chemical Corporation, Chicago, Ill.), trimethyl citrate, commercially available as Citroflex 1, (Monoflex Chemical Company, Greensboro, N.C.), N,N-dimethyl oleamide, commercially available as Halcomid M-18-OL (C. P. Hall Company, Chicago, Ill.), and the like, may be present.

Antioxidants and/or UV light stabilizer can also be used in combination or separately in concentrations of about 0.01 by weight up to about 5% by weight. Useful antioxidants include hindered phenols such as BHT, TBHQ, and BHA, which are sold under the tradename Tenox (Eastman Chemical Products), Ethanox, (Ethyl Corp.), and Irgazox (Ciba-Geigy). Light stabilizers for ultraviolet light and visible light include hindered amines such as Tinuvin 770, 765, and 622, and substituted benzotriazoles such as Tinuvin P 326, 327, 328 and 571 (Ciba-Geigy) can be used. Also, substituted benzophenones Cyasorb UV-531, UV-24 and UV-9, along with other products from American Cynamid Company can be used.

General Considerations

The hot melt ink compositions of the present invention will exhibit the following characteristics, at their temperature of application: (1) a viscosity of from about 1 to about 50 centipoises at a temperature of application from about 75° to about 175° C.; and a conductivity from about 100 to about 5000 microsiemens/cm at that same temperature range. The modifications of the principal components of the inks, as disclosed above, to achieve these desired operational characteristics is well within the skill in the art.

Operating temperatures of the inks of the present invention are generally from about 90° to about 140° C., with 115° being preferred. Higher temperatures are acceptable, although they may reduce the lifetime of the heater and printhead. Generally, the operating temperature is selected to obtain suitable ink viscosity while avoiding extensive fuming or smoking.

The viscosity of the jet ink composition at the operating temperature of the ink is generally from about 1 to about 50 centipoises, preferably from about 2 to about 20 centipoises, and most preferably from about 5 to about 15 centipoises. The viscosity of a given ink formulation can be adjusted depending on the specific type and amount of electrolyte-solvating and dissociating agent, viscosity reducing agent and hardening agent used. The ink composition, of course, should be thermally stable it its molten state so that it does not undergo decomposition to yield gaseous products or form solid deposits in the heater system. The addition of known thermal stabilizing agents to achieve a desired thermal stability is also within the skill of one in the art. Additionally, the jet ink composition should enable printed images with sufficient flexibility to prevent cracking or creasing.

Hot melt ink compositions of the present invention are generally prepared by combining all of the ingredients, heating the mixture to its melting point, which generally is from about 80° to about 130° C., and stirring the mixture for from about 5 seconds to about 10 minutes to obtain a homogenous, uniform melt. Obviously, therefore, all of the components of the ink composition, when mixed together, must be liquid at the operating temperature. When pigments are the selected colorants, the molten mixture may be subjected to grinding in an attritor or ball mill apparatus to effect dispersion of the pigment in the binder.

Printed images may be generated with the inks of the present invention by incorporating the inks into a thermal ink jet printer and causing droplets of the molten ink to be ejected in an imagewise pattern onto a substrate such as paper or transparency material. Suitable printers for employing the inks of the present invention include commercially available continuous ink jet printers.

The compositions of this invention can be applied to a wide range of porous and non-porous substrates, e.g., paper, metal, wood, plastics or glass without the need to form any special surface layer on the substrate. However, the invention is of special use in forming images on non-porous materials, e.g., plastics, plastic coated materials, glass and metals. The high temperature of the composition as it is deposited on a plastic substrate causes enhanced adhesion of the composition due to partial fusion with the substrate. In the case of porous substrates the compositions penetrate into the substrates as they cool. In both cases, the compositions of the invention solidify rapidly on the substrate to give a sharp image resistant to smudging.

The present invention is further illustrated by the following nonlimiting examples.

EXAMPLE 1

The components listed in the table below were combined to make a hot melt ink composition for use in continuous ink jet printing.

| COMPONENT | % WT. COMP. | WT. (g) |
| --- | --- | --- |
| Lauryl monoethanolamide (LMM) | 48 | 4.8 |
| Stearyl monoethanolamide stearate (MAS) | 25 | 2.5 |
| Paricin 220 | 25 | 2.5 |
| Potassium Thiocyanate | 2 | 0.2 |

This composition had a viscosity at 115° C. of 13.8 centipoises and a conductivity at 115° C. of 508 microsiemens/cm.

EXAMPLE 2

The components listed in the table below were combined to make a hot melt ink composition for use in continuous ink jet printing.

| COMPONENT | % WT. COMP. | WT. (g) |
| --- | --- | --- |
| Lauryl monoethanolamide (LMM) | 55 | 6.625 |
| Stearyl monoethanolamide stearate (MAS) | 38.4 | 4.625 |
| Ethylene vinyl acetate copolymer (Exxon MVQ 2528) | 4.1 | 0.5 |
| Potassium Thiocyanate | 2.5 | 0.3 |

This composition had a viscosity at 115° C. of 16.2 centipoises and a conductivity at 115° C. of 441 microsiemens/cm.

EXAMPLE 3

The components listed in the table below were combined to make a hot melt ink composition for use in continuous ink jet printing.

| COMPONENT | % WT. COMP. | WT. (g) |
| --- | --- | --- |
| Lauryl monoethanolamide (LMM) | 97.5 | 97.5 |
| Potassium Thiocyanate | 2.5 | 2.5 |

This composition had a viscosity at 115° C. of 11.6 centipoises and a conductivity at 115° C. of 799 microsiemens/cm.

EXAMPLE 4

The components listed in the table below were combined to make a hot melt ink composition for use in continuous ink jet printing.

| COMPONENT | % WT. COMP. | WT. (g) |
| --- | --- | --- |
| Polyethylene glycol (1000 MW) | 48.69 | 48.69 |
| Stearamide | 48.57 | 48.57 |
| Potassium Thiocyanate | 1.99 | 1.99 |

This composition had a viscosity at 115° C. of 9.7 centipoises and a conductivity at 115° C. of 836 microsiemens/cm.

EXAMPLE 5

The components listed in the table below were combined to make a hot melt ink composition for use in continuous ink jet printing.

| COMPONENT | % WT. COMP. | WT. (g) |
| --- | --- | --- |
| Lauryl monoethanolamide | 77.7 | 8 |
| EGDS | 19.4 | 2 |
| Potassium Thiocyanate | 2.9 | 0.5 |

This composition had a viscosity at 115° C. of 10.3 centipoises and a conductivity at 115° C. of 769 microsiemens/cm.

We claim:

1. A hot melt ink composition for use in continuous ink jet printing comprising from about 0.1% to about 5% by weight of an electrolyte, from about 30% to about 99% by weight of an electrolyte-solvating and dissociating compound selected from the group consisting of alkanolamides and polyethylene glycol, and from about 0.1% to about 10% by weight of an image-forming agent, said ink being solid at about 25° C., said ink liquefying at a temperature between about 75° C. and about 175° C., and said ink in the liquid stage having a conductivity of greater than about 100 microsiemens/cm.

2. The composition of claim 1 wherein said alkanolamide is a compound of the formula $$C_nH_{2n+1}CONHR,$$

where n is an integer from 10–17, R is $CH_2CH_2OH$ or $(CH_2CH_2O)_xCH_2CH_2OH$ and x is an integer from 1 to 9.

3. The composition of claim 1 wherein said alkanolamide is a bis-monoethanolamdie of a dibasic fatty acid.

4. The composition of claim 1 wherein said alkanolamide is a bis-diethanolamide of a dibasic fatty acid.

5. The composition of claim 2 wherein n=11 and R=$CH_2CH_2OH$.

6. The composition of claim 1 wherein said polyethylene glycol has a molecular weight from about 1000 grams/mole to about 2000 grams/mole.

7. The composition of claim 1 wherein said electrolyte is potassium thiocyanate.

8. The composition of claim 1 further comprising a viscosity reducing agent.

9. The composition of claim 8 wherein said viscosity reducing agent is selected from the group consisting of stearamide, stearyl monoethanolamide stearate, and ethylene glycol distearate.

10. The composition of claim 1 further comprising a hardening agent.

11. The composition of claim 10 wherein said hardening agent is selected from the group consisting of ricinoleamides, hydroxystearamides, hydrogenated castor oil, ethylene glycol distearate, 12-hydroxydodecanoic acid, ester derivatives of 12-hydroxydodecanoic acid, esters of methylene glycol, esters of propylene glycol, esters of glycerol, esters of ethylene glycol, and stearyl esters of 12-hydroxystearic acid.

12. The composition of claim 11 wherein said hydroxystearamide is N(2-hydroxy ethyl)-12 hydroxystearamide.

13. The composition of claim 1 further comprising a flexibilizing agent.

14. The composition of claim 13 wherein said flexibilizing agent is selected from the group consisting of ethylene vinylacetate copolymers, polyamides, amide waxes and ionomers.

15. A hot melt ink composition for use in continuous ink jet printing comprising from about 0.1% to about 5% by weight of electrolyte, from about 30% to about 99% by weight of an electrolyte-solvating and dissociating compound selected from the group consisting of alkanolamides and polyethylene glycol, and from about 0.1% to about 10% by weight of an image-forming agent, a viscosity reducing agent, and a hardening agent, said ink being a solid at about 25° C., said ink liquefying at a temperature between about 75° C. and about 175° C., and said ink in the liquid state having a conductivity of greater than about 100 microsiemens/cm.

16. The composition of claim 15 wherein said alkanolamide is a compound of the formula $$C_nH_{2n+1}CONHR,$$

where n is an integer from 10–17, R is $CH_2CH_2OH$ or $(CH_2CH_2O)_xCH_2CH_2OH$ and x is an integer from 1 to 9.

17. The composition of claim 15 wherein said alkanolamide is a bis-monoethanolamide of a dibasic fatty acid.

18. The composition of claim 15 wherein said alkanolamide is a bis-diethanolamide of a dibasic fatty acid.

19. The composition of claim 16 wherein $n=11$ and $R=CH_2CH_2OH$.

20. The composition of claim 15 wherein said viscosity reducing agent is selected from the group consisting of stearamide, stearyl monoethanolamide stearate and ethylene glycol distearate.

21. The composition of claim 15 wherein said hardening agent is selected from the group consisting of ricinoleamides, hydroxystearamides, hydrogenated castor oil, ethylene glycol distearate, 12-hydroxydodecanoic acid, ester derivatives of 12-hydroxydodecanoic acid, esters of methylene glycol, esters of propylene glycol, esters of glycerol, esters of ethylene glycol, stearyl esters of 12-hydroxystearic acid.

22. The composition of claim 21 wherein said hydroxystearamide is N(2-hydroxy ethyl)-12 hydroxystearamide.

23. A hot melt ink composition for use in continuous ink jet printing comprising from about 30 to about 99% of lauryl monoethanolamide, from about 0 to about 50% of stearyl monoethanolamide stearate, from about 0 to about 50% of N(2-hydroxyethyl)-12-hydroxystearamide, from about 0.5 to about 3.0% of potassium thiocyanate, and from about 0.1 to about 10% of image forming agent, based on the weight of the composition.

* * * * *